(12) United States Patent
Hamilton, II et al.

(10) Patent No.: US 6,633,977 B1
(45) Date of Patent: Oct. 14, 2003

(54) SYSTEM AND METHOD FOR COMPUTER SYSTEM DUPLICATION

(75) Inventors: Rick Allen Hamilton, II, Austin, TX (US); Steven Jay Lipton, Flower Mound, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/540,344

(22) Filed: Mar. 31, 2000

(51) Int. Cl.[7] .................................................. G06F 1/24
(52) U.S. Cl. ....................................................... 713/100
(58) Field of Search ........................ 713/1, 100; 714/15, 714/20

(56) References Cited

U.S. PATENT DOCUMENTS

| | | | |
|---|---|---|---|
| 4,653,112 A | 3/1987 | Ouimette | 382/69 |
| 5,278,982 A | 1/1994 | Daniels et al. | 395/600 |
| 5,355,498 A | 10/1994 | Provino et al. | 395/700 |
| 5,598,549 A | 1/1997 | Rathunde | 395/441 |
| 5,673,382 A * | 9/1997 | Cannon et al. | 714/6 |
| 5,784,578 A | 7/1998 | Galloway et al. | 395/285 |
| 5,799,147 A * | 8/1998 | Shannon | 714/6 |
| 5,819,020 A * | 10/1998 | Beeler, Jr. | 714/5 |
| 5,881,285 A | 3/1999 | DeLeeuw | 395/681 |
| 5,974,563 A * | 10/1999 | Beeler, Jr. | 714/5 |
| 6,038,665 A * | 3/2000 | Bolt et al. | 713/176 |
| 6,363,498 B1 * | 3/2002 | Howell | 713/15 |
| 6,363,499 B1 * | 3/2002 | Delo et al. | 714/15 |
| 6,385,707 B1 * | 5/2002 | Maffezzoni | 711/162 |
| 6,438,749 B1 * | 8/2002 | Chamberlain | 717/174 |

* cited by examiner

Primary Examiner—Thomas M. Heckler
(74) Attorney, Agent, or Firm—Joseph T. Van Leeuwen; David A. Mims, Jr.

(57) ABSTRACT

A data collection program collects data from a user's workstation and captures the user environment data, including user settings and program application data. The user environment data is stored for duplication processing on a new workstation. One embodiment provides for a workstation list that is read by the data collection program for collecting data from one or more workstations. The stored user environment data is then processed by a duplication process to duplicate the user environment data from the old workstation onto a new workstation. One embodiment includes saving the user environment data to a data storage area connected to a server and then read from the data storage area to duplicate the user environment data to a new workstation also connected to the server. Another embodiment includes saving the user environment data to a nonvolatile computer operable medium for duplicating user environment data to a new workstation.

30 Claims, 13 Drawing Sheets

SYSTEM AND METHOD FOR COMPUTER SYSTEM DUPLICATION

RELATED APPLICATIONS

This application is related to the following co-pending U.S. patent application Ser. No. 09/540,914 filed on the same day as the present application and having the same inventors and assignee: "System and Method for Event-Based Computer System Duplication" by Hamilton and Lipton. This application is also related to the co-pending U.S. patent application Ser. No. 09/422,361 having the same inventors and assignee as the present application and entitled "Method and System for Implementing Network Filesystem-Based Customized Computer System Automated Rebuild Tool."

BACKGROUND

1. Field of the Invention

The present invention relates to information processing technology. More particularly, the present invention relates to a system and method for simplifying the duplication user environment data in a computer system.

2. Description of the Related Art

The UNIX operating system is an interactive time-sharing operating system invented in 1969. The UNIX operating system is a multi-user operating system supporting serial and network connected terminals for multiple users. UNIX is a multitasking operating system allowing multiple users to use the same system simultaneously. The UNIX operating system includes a kernel, shell, and utilities. UNIX is a portable operating system, requiring only the kernel to be written in assembler, and supports a wide range of support tools including development, debuggers, and compilers.

As a multi-user operating system, UNIX allows multiple people to share the same computer system simultaneously. UNIX accomplishes this by time-slicing the computer's central processing unit, or "CPU," into intervals. Each user gets a certain amount of time for the system to execute requested instructions. After the user's allotted time has expired, the operating system intervenes by interrupting the CPU, saving the user's program state (program code and data), restores the next user's program state and begins executing the next user's program (for the next user's amount of time). This process continues indefinitely cycling through all users using the system. When the last user's time-slice has expired, control is transferred back to the first user again and another cycle commences.

The UNIX operating system is both a multi-user operating system and a multi-tasking operating system. As the name implies, the multi-user aspect of UNIX allows multiple users to use the same system at the same time. As a multi-tasking operating system, UNIX permits multiple programs (or portions of programs called threads of execution) to execute at the same time. The operating system rapidly switches the processor between the various programs (or threads of execution) in order to execute each of the programs or threads. IBM's OS/2 and Microsoft's Windows 95/98/NT are examples of single-user multi-tasking operating systems while UNIX is an example of a multiuser multi-tasking operating system. Multi-tasking operating systems support both foreground and background tasks. A foreground task is a task that directly interfaces with the user using an input device and the screen. A background task runs in the background and does not access the input device(s) (such as the keyboard, a mouse, or a touch-pad) and does not access the screen. Background tasks include operations like printing which can be spooled for later execution.

The UNIX operating system keeps track of all programs running in the system and allocates resources, such as disks, memory, and printer queues, as required. UNIX allocates resources so that, ideally, each program receives a fair share of resources to execute properly. UNIX doles out resources using two methods: scheduling priority and system semaphores. Each program is assigned a priority level. Higher priority tasks (like reading and writing to the disk) are performed more regularly. User programs may have their priority adjusted dynamically, upwards or downwards, depending on their activity and the available system resources. System semaphores are used by the operating system to control system resources. A program can be assigned a resource by getting a semaphore by making a system call to the operating system. When the resource is no longer needed, the semaphore is returned to the operating system, which can then allocate it to another program.

Disk drives and printers are serial in nature. This means that only one request can be performed at any one time. In order for more than one user to use these resources at once, the operating system manages them using queues. Each serial device is associated with a queue. When a programs wants access to the device (i.e., a disk drive) it sends a request to the queue associated with the device. The UNIX operating system runs background tasks (called daemons), which monitor the queues and service requests for them. The requests are performed by the daemon process and the results are returned to the user's program.

Multi-tasking systems provide a set of utilities for managing processes. In UNIX, these are ps (list processes), kill (kill a process), and & at the end of a command line (run a process in the background). In UNIX, all user programs and application software use the system call interface to access system resources such as disks, printers, and memory. The system call interface in UNIX provides a set of system calls (C language functions). The purpose of the system call interface is to provide system integrity, as all low-level hardware access is under the control of the UNIX operating system and not the user-written programs. This prevents a program from corrupting the system.

Upon receiving a system call, the operating system validates its access permission, executes the request on behalf of the requesting program, and returns the results to the requesting program. If the request is invalid or the user does not have access permission, the operating system does not perform the request and an error is returned to the requesting program. The system call is accessible as a set of C language functions, as the majority of UNIX is written in the C language. Typical system calls are: _read—for reading from the disk; _write—for writing to the disk; _getch—for reading a character from a terminal; _putch—for writing a character to the terminal; and _ioctl—for controlling and setting device parameters.

The Kernel

As the name implies, the kernel is at the core of the UNIX operating system and is loaded each time the system is started, also referred to as a system "boot." The kernel manages the resources of the system, presenting them to the users as a coherent system. The user does not have to understand much, if anything, about the kernel in order to use a UNIX system. The kernel provides various necessary functions in the UNIX environment. The kernel manages the system's memory and allocates it to each process. It takes time for the kernel to save and restore the program's state and switch from one program to the next (called dispatching). This action needs to execute quickly because time spent switching between programs takes away from the time available to actually run the users' programs. The time spent in the "system state" where the kernel performs tasks like switching between user programs is the system overhead and should be kept as low as possible. In a typical UNIX system, system overhead should be less than 10% of the overall time.

The kernel also schedules the work to be done by the central processing unit, or "CPU," so that the work of each user is carried out efficiently. The kernel transfers data from one part of the system to another. Switching between user programs in main memory is also done by the kernel. Main system memory is divided into portions for the operating system and user programs. Kernel memory space is kept separate from user programs. When insufficient main memory exists to run a program, another program is written out to disk (swapped) to free enough main memory to run the first program. The kernel determines which program is the best candidate to swap out to disk based on various factors. When too many programs are being executed on the system at the same time, the system gets overloaded and the operating system spends more time swapping files out to disk and less time executing programs causing performance degradation. The kernel also accepts instructions from the "shell" and carries them out. Furthermore, the kernel enforces access permissions that are in place in the system. Access permissions exist for each file and directory in the system and determine whether other users can access, execute, or modify the given file or directory.

Files and Directories

For file handling, UNIX uses a hierarchical directory structure for organizing and maintaining files. Access permissions correspond to files and directories. As previously stated, the UNIX operating system organizes files into directories which are stored in a hierarchical tree-type configuration. At the top of the tree is the root directory which is represented by a slash (/} character. The root directory contains one or more directories. These directories, in turn, may contain further directories containing user files and other system files. A few standard directories that will be found in many UNIX are as follows:

/bin This directory contains the basic system commands.

/etc This directory contains system configuration files and programs used for administrating the system.

/lib This directory contains the system libraries.

/tmp This directory is used to store temporary files.

/usr/bin This directory contains the commands that are not stored in /bin.

/usr/man This directory contains manual pages for programs

/usr/local This directory contains local programs that were installed by the system administrator (sysadmin) and were not included with the original system. In particular, /usr/local/bin contains local command files (binaries), and /usr/local/man contains local manual pages.

/home The actual directory location varies from system to system, but somewhere on the system will be a location where all of the users' home directories are located.

The fundamental structure that the UNIX operating system uses to store information is the file. A file is a sequence of bytes. UNIX keeps track of files internally by assigning each file a unique identification number. These numbers, called i-node numbers, are used only within the UNIX kernel itself. While UNIX uses i-node numbers to refer to files, it allows users to identify each file by a user-assigned name. A file name can be any sequence of characters and can be up to fourteen characters long.

There are three types of files in the UNIX file system: (1) ordinary files, which may be executable programs, text, or other types of data used as input or produced as output from some operation; (2) directory files, which contain lists of files in directories outlined above; and (3) special files, which provide a standard method of accessing input/output devices.

Internally, a directory is a file that contains the names of ordinary files and other directories and the corresponding i-node numbers for the files. With the i-node number, UNIX can examine other internal tables to determine where the file is stored and make it accessible to the user. UNIX directories themselves have names, examples of which were provided above, and can be up to fourteen characters long.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk drives and disk arrays. UNIX organizes a disk into a sequence of blocks. These blocks are usually either 512 or 2048 bytes long. The contents of a file are stored in one or more blocks which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Addresses 12 and 13 are used for second level and third level indirect blocks, respectively, with the indirect addressing chain before the first data block growing by one level as each new address slot in the direct i-node is required.

All input and output (I/O) is done by reading and writing files, because all peripheral devices, even terminals, are treated as files in the file system. In a most general case, before reading and writing a file, it is necessary to inform the system of the intention to do so by opening the file. In order to write to a file, it may also be necessary to create it. When a file is opened or created (by way of the "open" or "create" system calls), the system checks for the right to do so and, if the user has the right to do so, the system returns a non-negative integer called a file descriptor. Whenever I/O is to be done on this file, the file descriptor is used, instead of the file name, to identify the file. The open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls—"read" and "write"—which are accessed from programs having functions of the same name. For both system calls, the first argument is a file descriptor, the second argument is a pointer to a buffer that serves as the data source or destination, and the third argument is the number of bytes to be transferred. Each "read" or "write" system call counts the number of bytes transferred. On reading, the number of bytes returned may be less than the number requested because fewer bytes than the number requested remain to be read. A return code of zero means that the end-of-file has been reached, a return code of –1 means that an error occurred. For writing, the return code is the number of bytes actually written. An error has occurred if this number does not match the number of bytes which were supposed to be written.

Shells

UNIX monitors the state of each terminal input line connected to the system with a system process called getty. When getty detects that a user has turned on a terminal, it presents the logon prompt, and when the userid and password are validated, the UNIX system associates a shell program (such as sh) with that terminal placing the user in the shell program. The shell program provides a prompt that typically signifies which shell program is being executed. The user types commands at the prompt. The shell program acts as a command interpreter taking each command and passing them to the kernel to be acted upon. The shell then displays the results of the operation on the screen. Users use the shell to create a personalized environment that suits the needs of the user. The user can change environment variables that control the user's environment.

The EDITOR environment variable sets the editor that will be used by other programs such as the mail program. The PAGER environment variable sets the pager that will be used by programs such as man to display manual pages. The PATH environment variable specifies the directories that the shell is to look through to find a command. These directories are searched in the order in which they appear. The PRINTER environment variable sets the printer to which all output is sent by the lpr command. The SHELL variable sets the default shell that is used by the user. The TERM variable sets the terminal type for programs such as the editor and pager. The TZ environment variable sets the time zone where the user is located.

There are several shells that are available to UNIX users. Each shell provides different features and functionality than other shells. The most common UNIX shell programs are the "Bourne" shell, the "C" shell, the "TC" shell, the "Korn" shell, and the "BASH" shell. As well as using the shell to run commands, each of these shell programs have a built-in programming language that a user can use to write their own commands or programs. A user can put commands into a file—known as a shell script—and execute the file like a command or program. Shells invoke two types of commands: internal commands (such as set and unset) which are handled by the shell program and external commands (such as ls, grep, sort, and ps) which are invoked as programs.

Challenges With Duplicating Systems in the Prior Art

One advantage of the UNIX operating system is that users can customize their working environment to suit their needs. For example, users can choose a default editor, a pager to display manual pages, a path to specify directories that are searched for commands, a default printer, a terminal type for use by the editor and the pager, a time-zone for displaying the correct time, and the shell program that is associated with the user's terminal upon logging on to the system.

One challenge in today's complex computing environment is moving a user from one system to another due to system changes or user relocation from one system to another system. Because of computer complexity and the amount of customizing a user may make to his or her environment, duplicating a user's computing environment has become even more challenging. Recreating UNIX images, in particular, requires that numerous system parameters, including printer definitions, tty definitions (terminal definitions or the name of a particular terminal controlling a given job or even serial port definitions—in UNIX such devices have names of the form tty*), network interfaces, user Ids, and passwords. Failure to duplicate all such parameters may result in the inability of the user to run key applications or access critical resources following such a system duplication. Challenges in present duplication schemes wherein the duplication is largely a manual effort include time consuming manual tasks performed by the user and/or system administrator and the fact that such manual tasks are prone to errors.

SUMMARY

It has been discovered that user environment data can be duplicated from one workstation to another workstation in a semi-automated fashion. Initially, an automated data collection process collects user environment data from the old computer system. User environment data may include application program data, license information, tty settings, customized directories, and other user customized workstation environment variables. A list of workstations can also be used to duplicate a number of workstations, for example when a group of individuals are upgrading their workstations. The user environment data is stored for later duplication onto a new workstation. In one embodiment, the user environment data is stored onto a data storage area of a common server so that the new workstation can read the user environment data from the common server's data storage area. In another embodiment, the user environment data is stored onto a removable computer operable medium, such as a diskette, for transporting and inputting into the new workstation. Duplicating the user environment settings on a new workstation involves reading the user environment data stored from the data collection process previously executed on the old workstation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
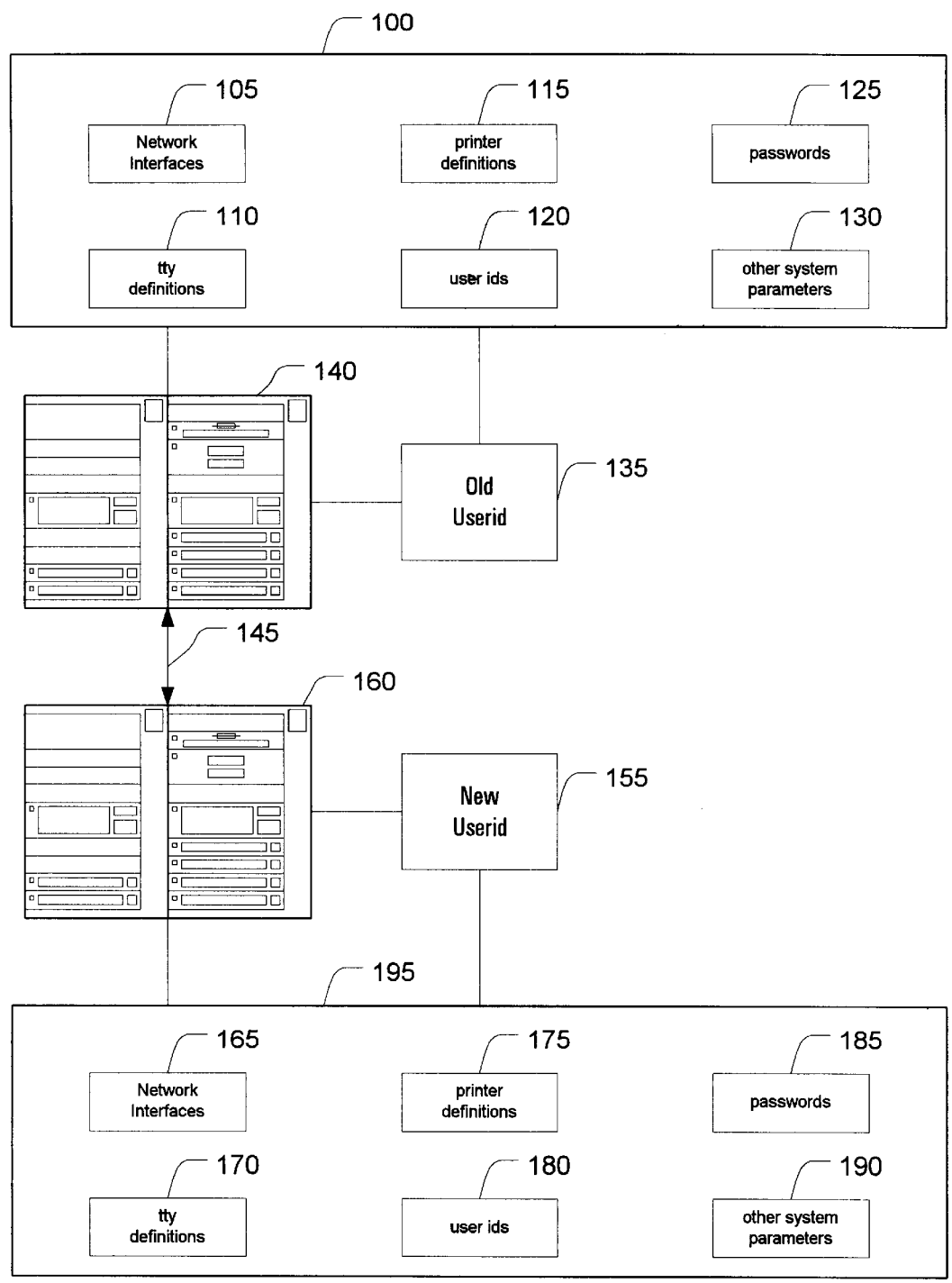
FIG. 1 is a system diagram showing user environment data being duplicated through a network interface.

FIG. 1 is a system diagram illustrating user environment data being copied and sent from one computer system to another computer system. The user's old user environment data 100 includes network interfaces 105, tty definitions 110, printer definitions 115, userids 120, passwords 125, and other system parameters 130, such as application specific information. In essence, old user environment data 100 includes the customizations and modifications made to the user's account as a result of the user's preferences or made so the user could better perform his or her job related tasks. In this example, the user is moving from old userid 135 in old computer system 140 to new userid 155 connected to new computer system 160. Once old user environment data 100 is gathered from old computer system 140, they are transmitted to new computer system 160 over network interface 145. Network interface 145 may be the Internet, a local area network (or LAN), a modem or ISDN connection, or any known method to communicate data between computer systems.

After old user environment data 100 has been received at new computer system 160, a process is invoked that duplicates old user environment data 100 onto new computer system 160 creating new user environment data 195. Similarly to old user environment data 100, new user environment data 195 includes network interfaces 165, tty definitions 170, printer definitions 175, userids 180, passwords 185, and other system parameters 190, such as application specific information. After old user environment data 100 has been duplicated onto new computer system 160, the customization settings are ultimately the same as the settings the user was accustomed to using on old computer system 140.

In addition to moving from one system to another system, environment data 100 may be captured in response to various events that occur in the system. For example, on a given schedule, the user's environment data may be captured and stored on old computer system 140 or new computer system 160. In this manner, the environment data 100 is periodically captured so that if a system failure occurs on old computer system 140, new userid 155 can quickly be created and the environment data restored creating new environment data 195 and the user can have a substantially similar system in operation in a minimum amount of time. Other events, or triggers, may be to capture environment data 100 each time environment data 100 is modified by the user. In this manner, the old environment data 100 would have an up to date copy. It may also be advantageous to keep multiple copies of old environment data 100 after subsequent capture operations have taken place. By keeping multiple copies of old environment data 100, the user can quickly regress to a former set of environment data should newly applied updates to the environment data prove to be undesirable by the user. Another event, or trigger, may be a command from a centralized operations area that periodically captures several users' environment data without need of such users' intervention. In this way, systems management personnel can have confidence in restoring user environment data should a system failure occur for one or more of the users they support.

Figure 2:
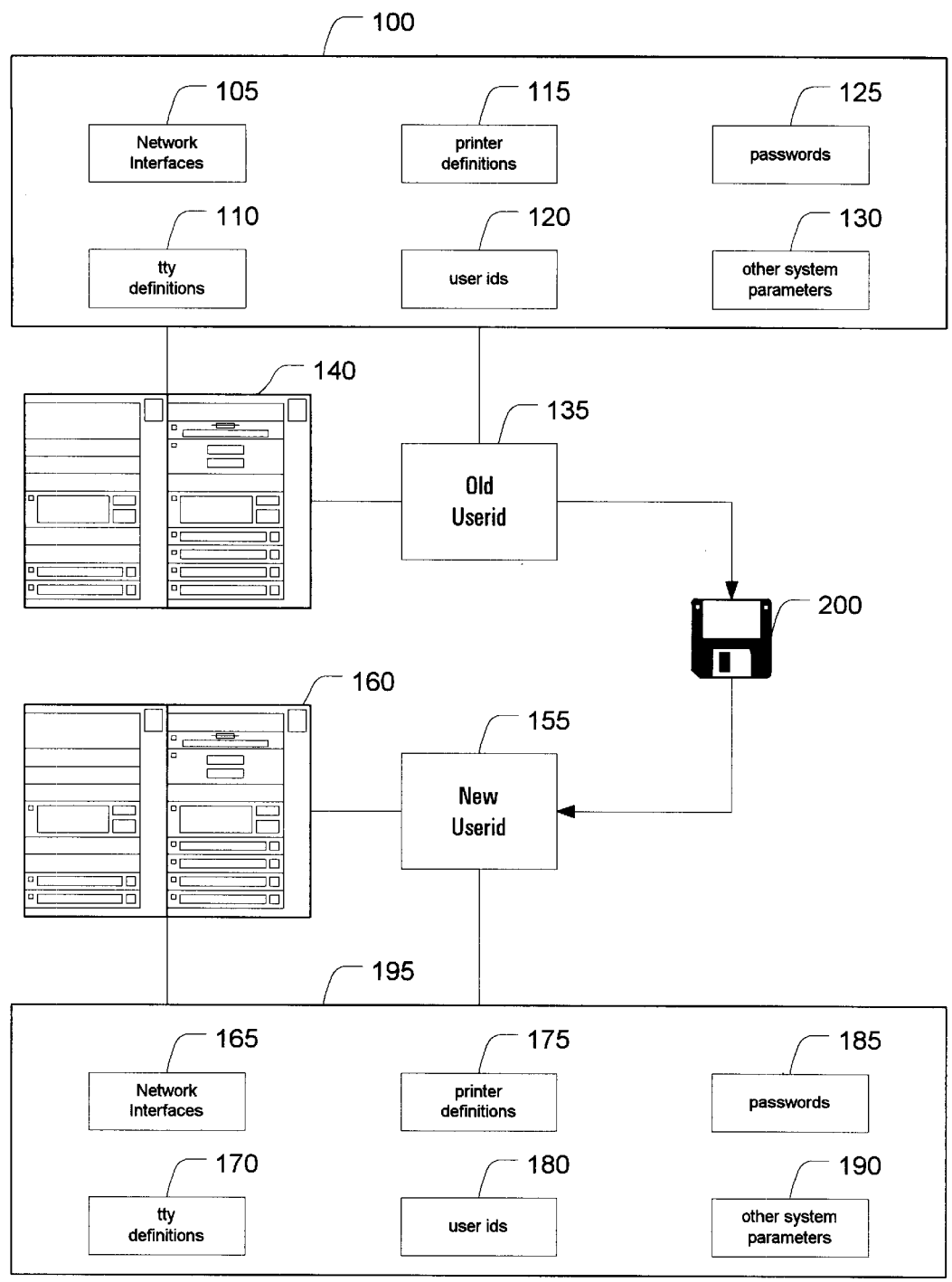
FIG. 2 is a system diagram showing user environment data being duplicated through a computer operable medium.

FIG. 2 is another system diagram similar to the system diagram shown in FIG. 1. In this system, however, old user environment data are written onto nonvolatile medium 200. The user then inserts nonvolatile medium 200 into new computer system 160 and the environment data is read in order to create new user environment data 195. Nonvolatile medium 200 may be a diskette, magnetic tape, ZIP disk, JAZ disk, CD-R (recordable CD-ROM), hard drive, optical disk, or any medium that can transfer data by being transported from one computer system to another. A user may wish to transfer old configuration data 100 for many reasons. For example, a copy of old configuration data 100 onto nonvolatile medium 200 can be used as a backup in case the system experiences a catastrophic failure. Another example would be if either old computer system 140 or new computer system 160 were isolated from each other due to security or other business concerns. The capture of old user environment data 100 in response to events described in FIG. 1. An event-driven capture program that stores old user environment data 100 onto nonvolatile medium 200 has the further advantage of being portable, allowing such captured user environment data to be stored off-site or in a location that would be safe in the event of a catastrophic hardware or building failure, such as a fire or flood.

Figure 3:
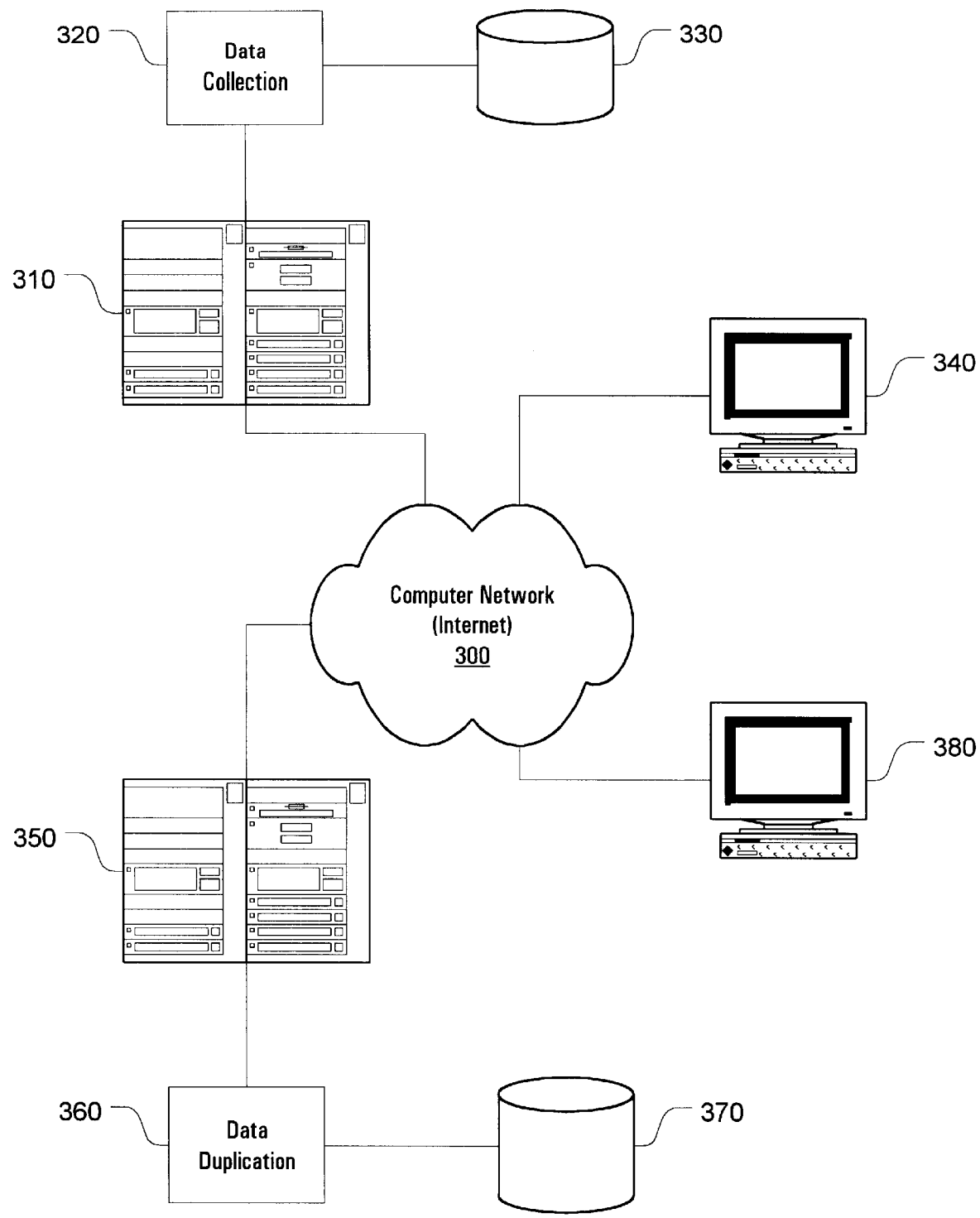
FIG. 3 is a network diagram showing user environment data being duplicated across a network.

FIG. 3 shows a network diagram not unlike the diagram shown in FIG. 1. In this figure, computer network 300 is shown as a common network connecting a variety of computer systems and devices. Computer network 300 provides the medium used to communicate between the various devices shown attached to computer network 300. Computer network 300 may include permanent connections, such as wire or fiber optic cables, or temporary connections made through telephone network connections. In the depicted example, computer network 300 is the Internet, with computer network 300 representing a worldwide collection of networks and gateways that use the TCP/IP suite of protocols to communicate with one another. At the heart of the Internet is a backbone of high-speed data communication lines between major nodes or host computers, consisting of thousands of commercial, governmental, educational, and other computer system that route packets of data and messages. Computer network 300 could also be implemented as a number of different types of networks, such as an intranet, a local area network (LAN), or a wide area network (WAN).

In FIG. 3, old computer system 310 is shown with data collection process 320 collecting user environment data from storage device 330 attached to old computer system 310. Collection process 320 may be user-invoked or may be invoked as result of an event as described for FIGS. 1 and 2. Storage device 330 may be a direct access storage device (DASD), file system, hard drive, or other nonvolatile data storage connected to old computer system 310. Old terminal 340 is also shown connected to computer network 300 for user to log onto and use old computer system 310. Data collection process 320 collects the user's environment data and transfers the information through computer network 300 to new computer system 350. Data duplication process 360 is invoked on new computer system 350 duplicating the user's old environment settings from old computer 310 onto new computer system 350. The environment settings are saved on storage device 370 for use with new computer system 350. After data duplication process 360 is completed, the user can log onto new computer system 350 and be presented with the same customized environment previously set for the old computer system. Flexibility in the system also permits to allow data collection process 320 to collect the user's environment data and store the information onto old computer system 310. When the user has moved to new computer system 350, the user can invoke data duplication process 360 on new computer system 350 copying data, through remove copy commands (rcp) or other such command, transmitting the user's environment data through computer network 300 duplicating the user's old environment settings from old computer 310 onto new computer system 350.

Figure 4:
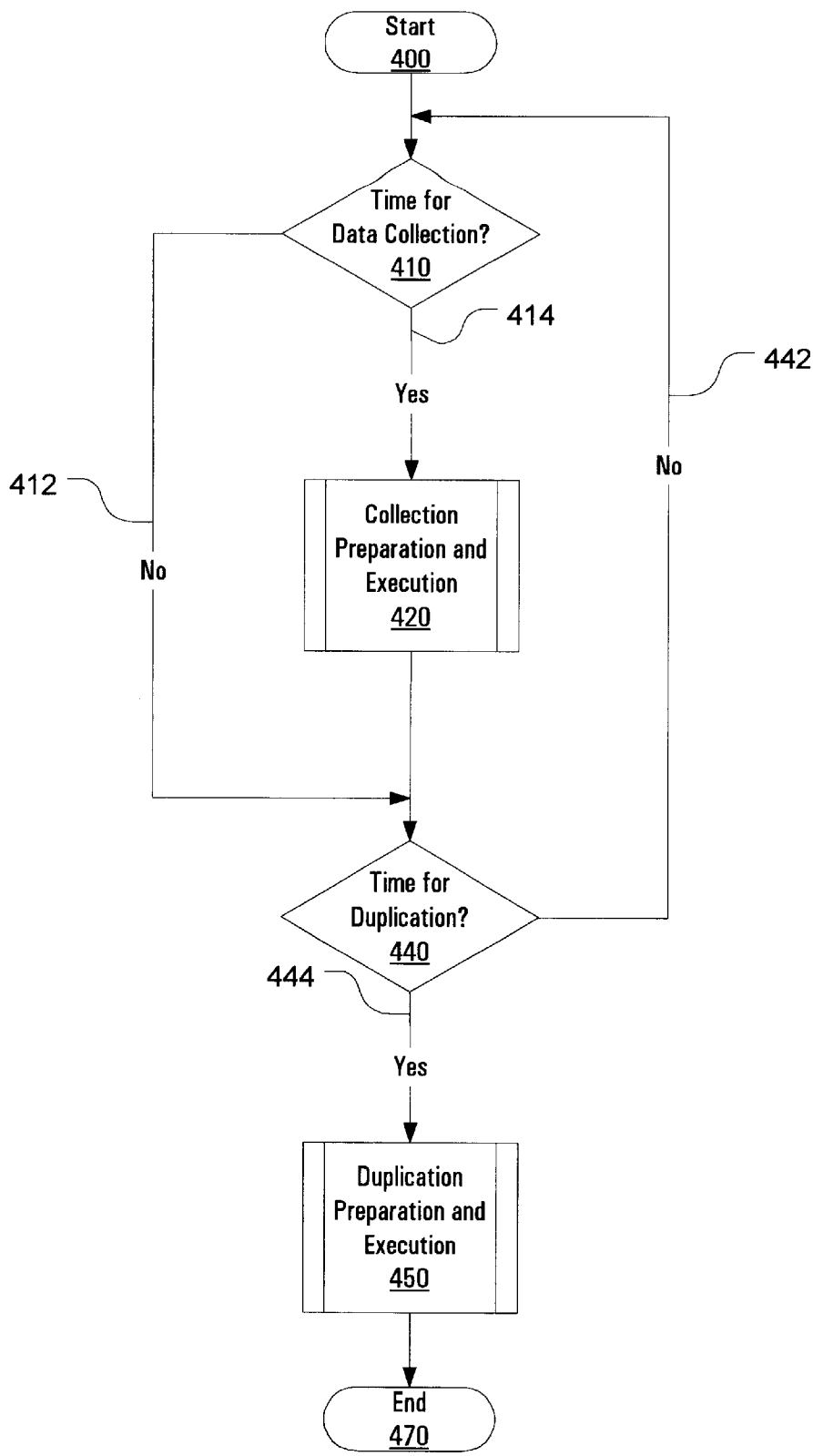
FIG. 4 is a high-level flowchart showing one embodiment of the present invention.

FIG. 4 shows a high-level flowchart for collecting data and duplicating data. The process is commenced at start 400 whereupon a decision is made to determine whether it is time for data collection at decision 410. Decision 410 can be based upon various factors. For example, data collection could be scheduled to repeat at various time intervals to backup the customization data. Another trigger for decision 410 could a monitor that sets a flag or indicator any time user environment data is changed. If the flag is set, the data collection process is invoked. In addition, decision 410 could be a manual decision that is only made when the user is moving from one system to another. Decision 410 could also be made by systems management personnel that decide when to collect data for a number of users. If decision 410 is false (i.e., not time for data collection), no branch 412 is taken. If decision 410 is true (i.e., time for data collection), yes branch 414 is taken to execute collection process 420 (see FIG. 5 for a detailed flowchart of the data collection process). Data collection is performed with the intention of duplicating personality information on a new workstation. In particular, and as described in further detail in FIG. 5, data collection includes an awareness of many system parameters, including printer definitions, tty definitions, network interfaces, user Ids, and passwords. The system parameter values define a system's "personality." Personality information can be thought of as any user and/or group selectable parameters, settings, and/or options used for customizing either a computer system, software, or firmware attributes. Personality parameters might be as uncomplicated as menu color schemes or as complex as the specification of preferred algorithms needed for processing information with a particular application program. Following either processing of collection process 420 or no branch 412, a second decision is made as to whether it is time for duplication processing at decision 440. If decision 440 is false (i.e., not time for duplication processing), no branch 442 is taken looping back to start 400 and decision 410. On the other hand, if decision 440 is true (i.e., time for duplication processing), yes branch 444 is taken to execute duplication process 450 (see FIG. 6 for details about duplication process 450). Following duplication process 450, processing terminates at termination 470.

Figure 5:
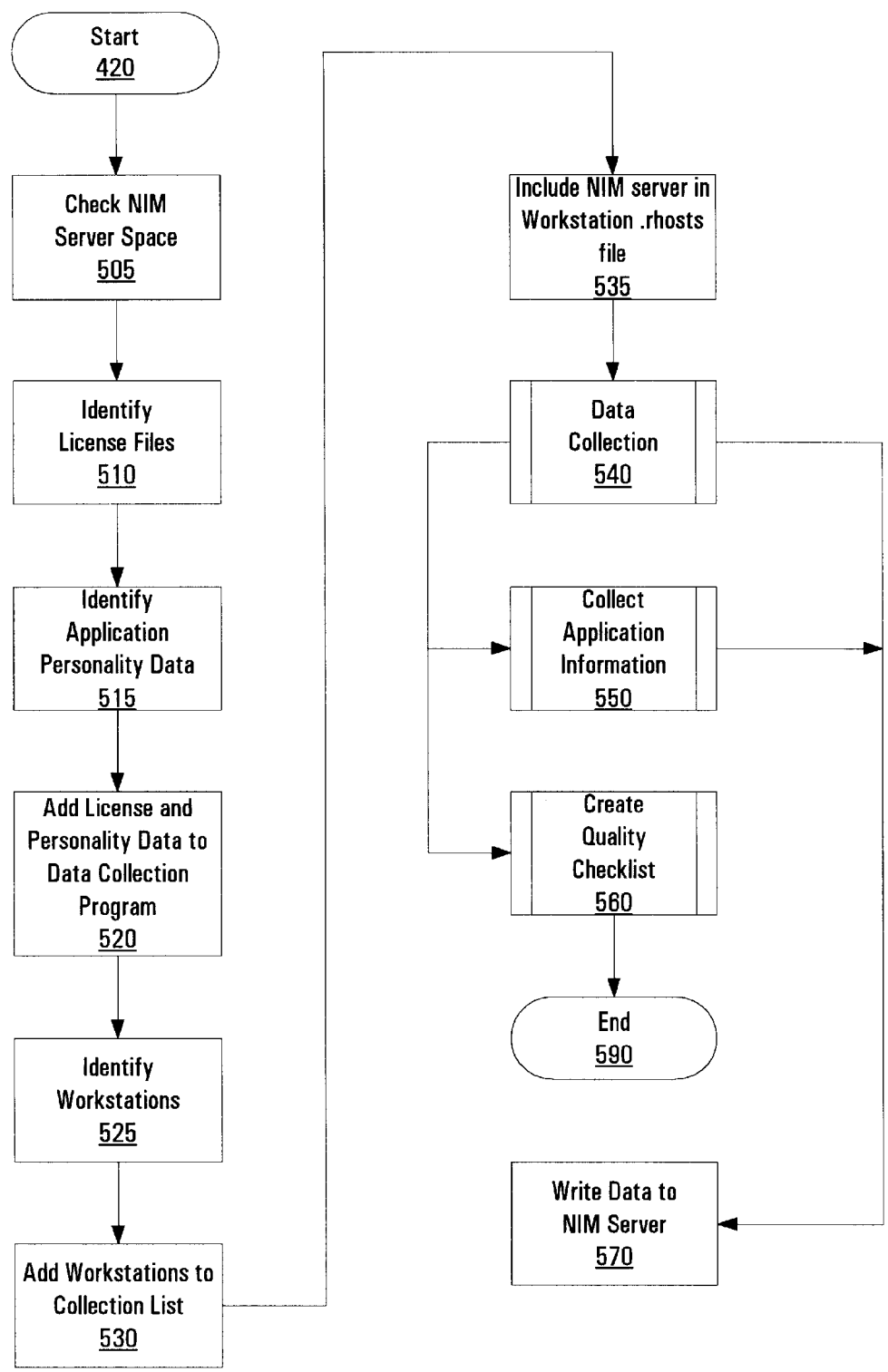
FIG. 5 is a mid-level flowchart showing the collection phase of one embodiment of the present invention.

FIG. 5 shows a mid-level flowchart containing details of collection process 420 shown in FIG. 4. The process is commenced at start 420 whereupon NIM server space is checked (step 505) to determine whether the NIM server has sufficient space to hold the data collected by collection process 420. If insufficient room exists on the NIM server an error message is displayed and processing is terminated. If sufficient room exists on the NIM server, license files are identified (step 510) to identify license file information that needs to be collected. In one embodiment, identifying license files is a manual process whereby the user modifies script files to identify the license files. The term "script file" as used herein refers to shell script files used with shells programs within the UNIX operating system, examples of which are included in the appendices. The functionality of such script files could be implemented in other programmatic fashions, such as interpreted languages such as REXX and BASIC, as well as compiled languages, such as C and Pascal (with data files used to identify license files and the like rather than recompiling the program files). Consequently, the term "script" is used herein to represent any programming language that could be used to implement the functionality of the present invention.

The script files will later be executed by the computer system to perform data collection processing. After identifying license files (step 510) completes, application personality data is identified (step 515) to identify applications installed and also identify customized settings corresponding to such applications. Again, in one embodiment such identification is done manually and script files are modified respective to the application personality data for subsequent execution by the computer system. Next, license and personality data are added to the data collection program (step 520) to identify the information to be collected to the data collection script. One embodiment of the present invention allows for data collection and duplication to be performed for multiple workstations. In identifying workstations (step 525), the workstations that will have data collected are identified by address. These addresses are then included in a collection list (step 530). The data collection scripts that will be invoked subsequently read the workstation collection list and perform data collection for each workstation identified in the list. In a UNIX environment, each workstation has a remote hosts file (.rhosts file) that will be modified (step 535) to make sure that the NIM server is included as a remote host for the workstation so that the NIM server can execute the script file and collect data from the workstations listed in the collection list. Including the NIM server in the workstation .rhost files is done to allow remote shell (rsh) commands to be executed on each workstation. In an alternative embodiment, the data collection process could be done on the workstation itself rather than having a remote server perform the data collection. One advantage with having a remote server perform the collection processing is that multiple workstations can have data collection performed on a regular schedule by information technology personnel rather than have the user perform the processing on his or her local workstation.

For each workstation listed in the collection list, data collection process (step 540), collect application information process (step 550), and create quality checklist process (step 560) are performed and the data is written to the NIM server (step 570). Data collection process (step 540), collect application information process (step 550), and create quality checklist process (step 560) are each described in further detail in FIGS. 7, 8, and 9, respectively. After the data is written to the NIM server, data collection processing ends (step 590).

Figure 6:
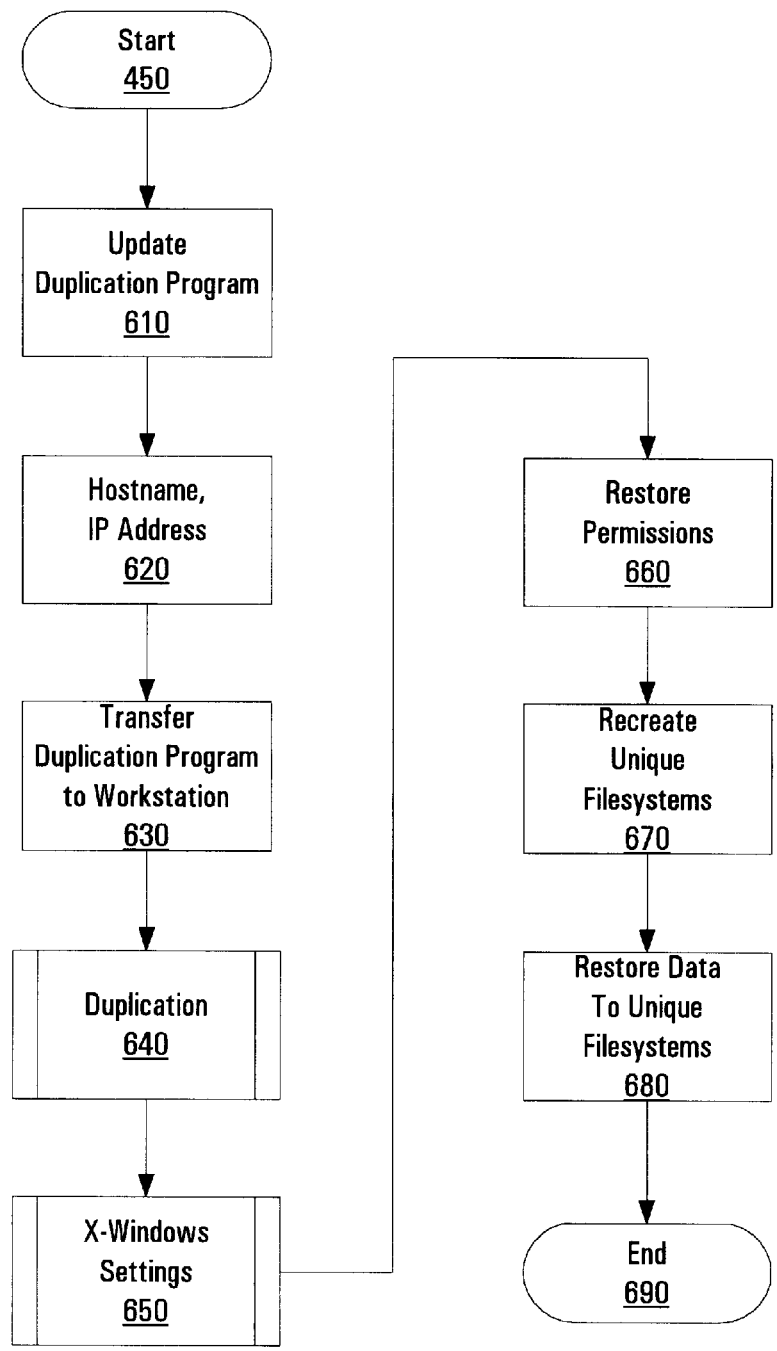
FIG. 6 is a mid-level flowchart showing the duplication phase of one embodiment of the present invention.
Figure 10:
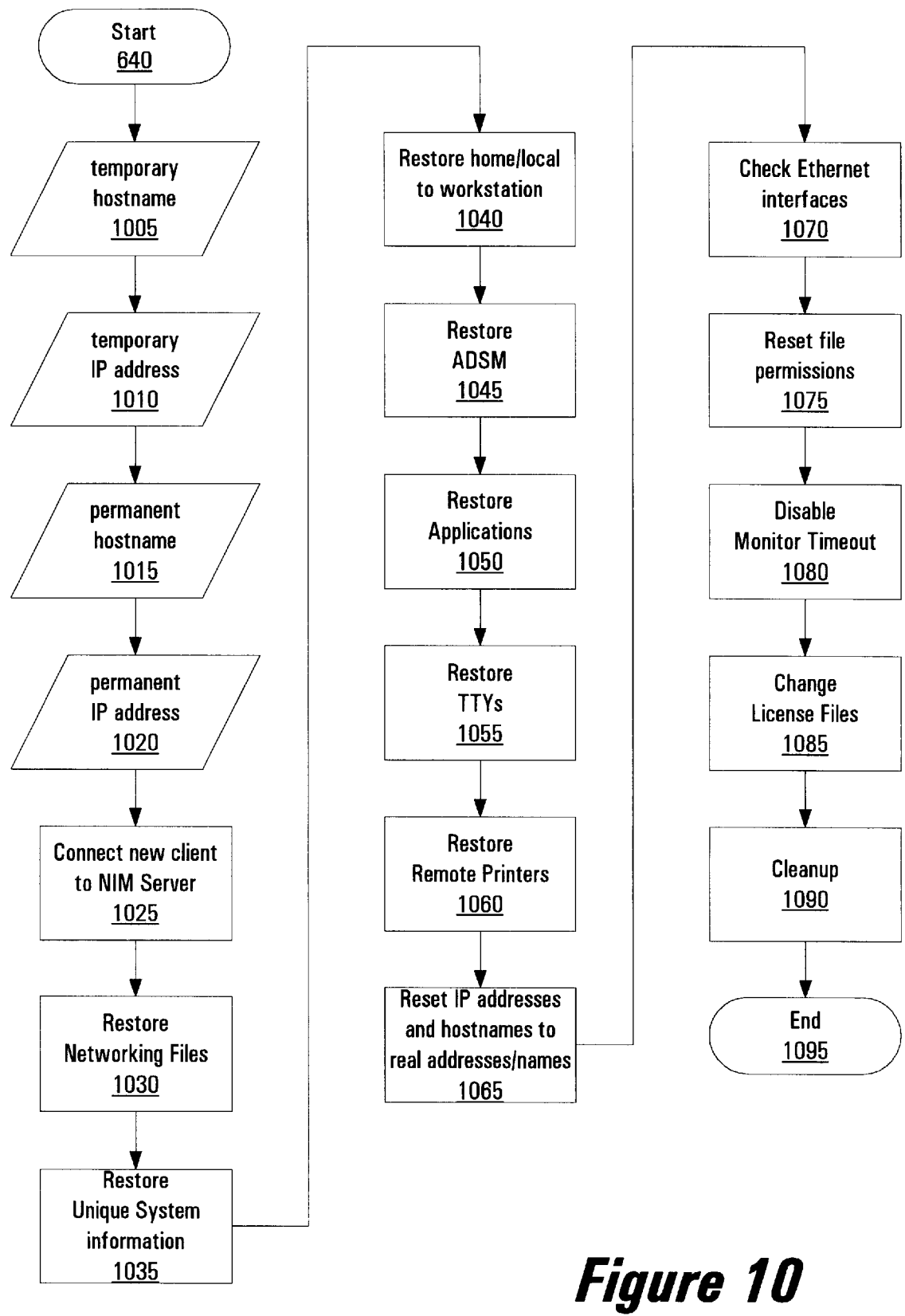
FIG. 10 is a lower-level flowchart showing the duplication steps in one embodiment of the present invention.
Figure 11:
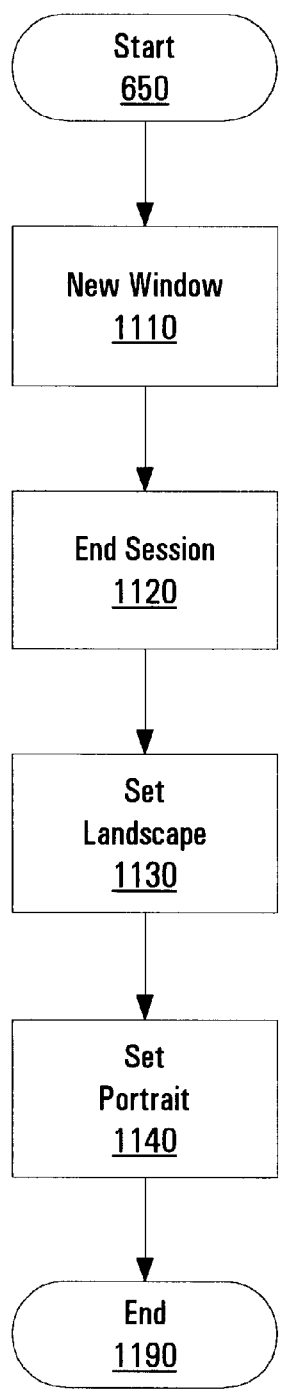
FIG. 11 is a lower-level flowchart showing the display settings duplication in one embodiment of the present invention.

FIG. 6 is a mid-level flowchart of the processing performed by duplication preparation and execution process 450 shown in FIG. 4. The process is commenced at start (step 450) whereupon duplication program is updated (step 610). Update duplication program (step 610) uses the information that was written to the NIM server (see FIG. 5, step 570) to update the duplication script that will be executed on the workstation. Next, during hostname IP address process (step 620) a permanent hostname and IP address is provided for the user's new workstation. This information will be used when duplicating the personality data previously collected from the old workstation. The duplication program is then transferred to the workstation (step 630) where it will be executed from a root user session on the new workstation. The duplication program (step 640) is then executed to duplicate the settings previously collected from the old workstation onto the new workstation. Details of the duplication (step 640) processing are shown in FIG. 10. The duplication program subsequently calls the X-Windows settings program (step 650) so that customization of X-Windows (in a UNIX environment) can occur. Details of the X-Windows settings program (step 650) are shown in FIG. 11. Next, file permissions are restored (step 660) using a custom permission list (perm.list). After file permissions are restored, unique filesystems are created (step 670) from the information previously collected from the old workstation. After the unique filesystems are created, data previously collected from the unique filesystems is restored (step 680) to the filesystems created during step 670. After the data has been restored, the duplication process ends at termination step 690.

Upon completion, a user's duplicated workstation includes personality information matching the information that was present in the user's previous workstation. The user is thus freed from the tedious tasks associated with re-customizing the new workstation. The mundane tasks of gathering personality information and using that data for customizing a group of workstations is automated and may be performed from a centralized location. The system administrator, on the other hand, is freed from the responsibility of manually re-configuring a user's new workstation following the user's move from one workstation to another. By providing the means, both to capture data about workstations and duplicate it on physically separate media, the present invention ensures a smoother transition from one workstation to the next and reduces the amount of downtime a user experiences in configuring a new workstation. The present invention provides additional benefits to UNIX-based operation. Although developed on IBM's AIX operating system, the principles here are easily extendable to other UNIX environments, such as LINUS, Solaris, and others. The principles here are also extendable to non-UNIX-based operating systems, such as other multi-user operating systems and other multitasking operating systems (such as IBM's OS/2 and Microsoft's Windows 95/98/NT). The concept of duplicating user environment settings across a wide number of computer systems is both new and unique and will benefit anyone with customized user settings that needs to migrate from one workstation to another.

Figure 7:
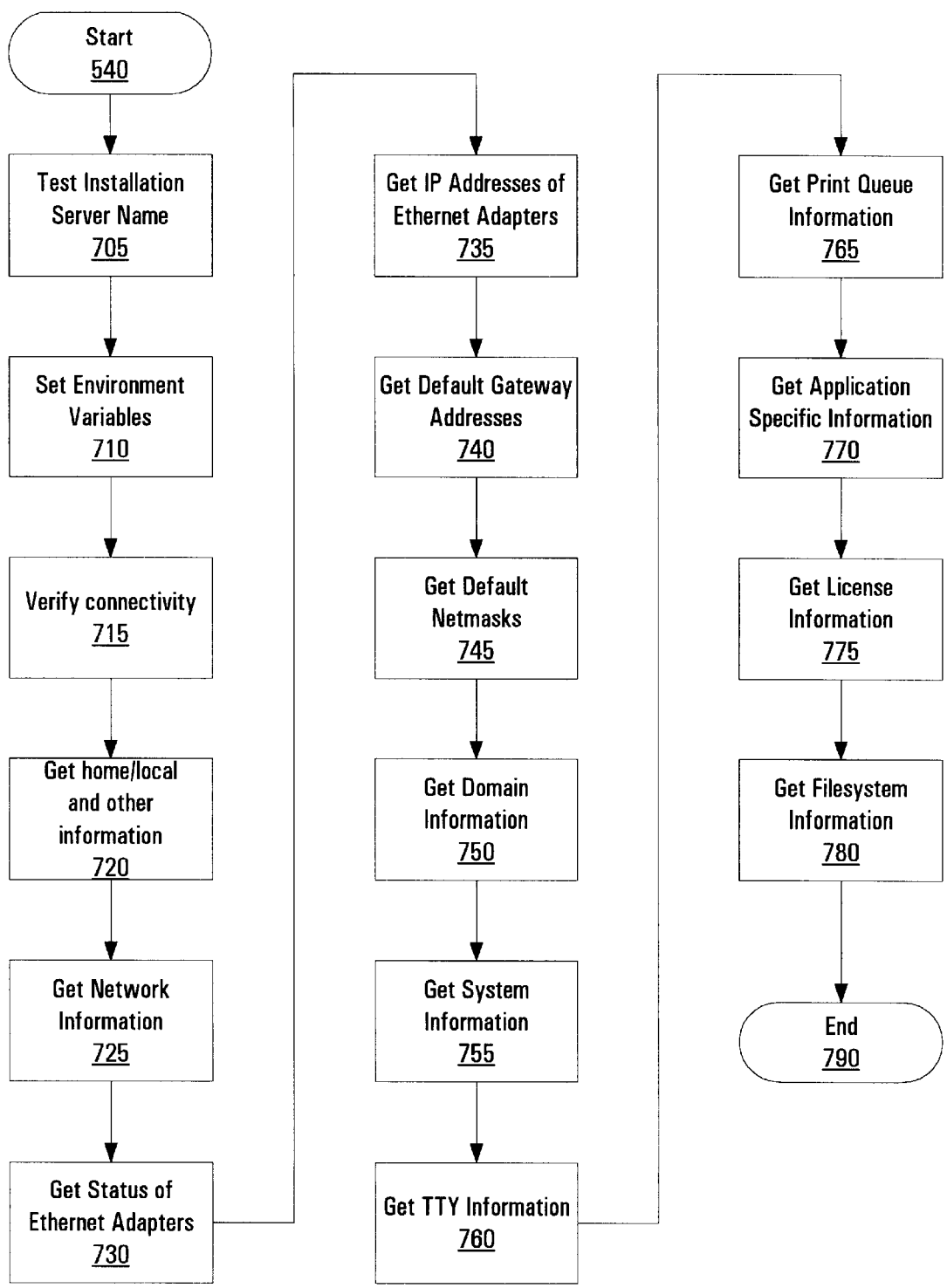
FIG. 7 is a lower-level flowchart showing the data collection steps in one embodiment of the present invention.

FIG. 7 shows a low-level flowchart for the data collection process (step 540) previously shown in FIG. 5. Data collection processing commences at step 540. First, a test is made to determine the name of the installation server (step 705) which, in a UNIX environment, is preferably set to be the NIM server (nimsvr). Next, environment variables are set (step 710) in preparation for further processing. After environment variables have been set, the connectivity between the server and the client workstations is verified and a working list of hostnames is created (step 715). After connectivity has been verified, information is retrieved from the workstations /home/local directory and other workstation specific information is gathered (step 720). Next, network information is retrieved (step 725) which includes retrieving key network configuration files, getting the status of the workstations' Ethernet adapters (step 730), getting the IP addresses corresponding to the Ethernet adapters (step 735), getting the default gateway addresses to the network (step 740), getting the default netmasks (step 745), and getting the domain information (step 750) which includes the domain name and name server addresses. After the network information is retrieved, system information is retrieved (step 755). Then tty information is retrieved from the old workstation (step 760). After tty information has been retrieved, print queue information is retrieved (step 765). Next, application specific data (previously identified in step 515 shown in FIG. 5) is retrieved (step 770). After application specific data has been retrieved, license information (previously identified in step 510 shown in FIG. 5) is retrieved. Finally, filesystem information is retrieved (step 780). The information retrieved during the collection process shown in FIG. 7 is stored in a storage area of the NIM server. In an alternative embodiment, the information retrieved is stored on removable nonvolatile computer operable media, such as a diskette, tape, or CD-R.

Figure 8:
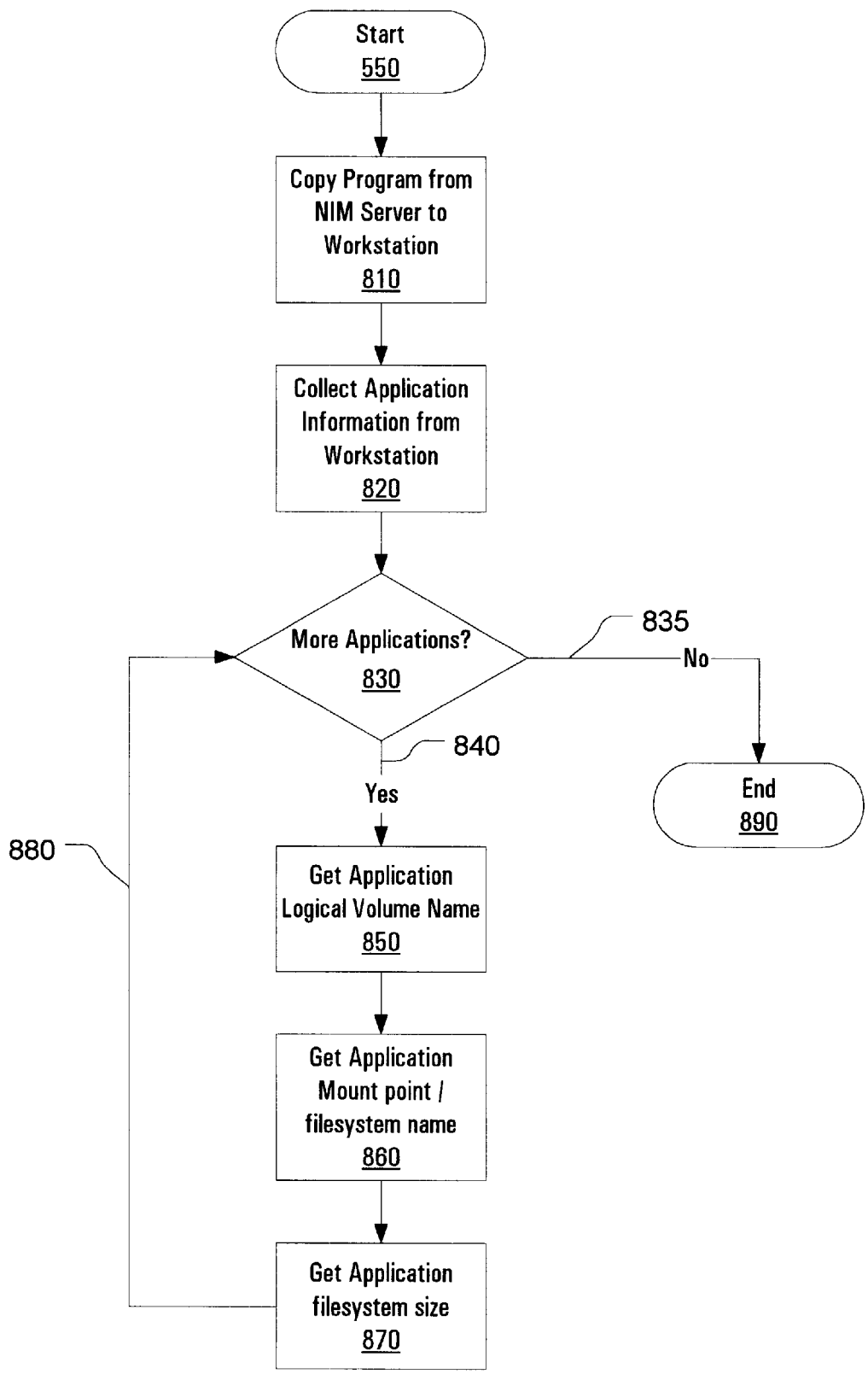
FIG. 8 is a lower-level flowchart showing the application information collection in one embodiment of the present invention.

FIG. 8 is a low-level flowchart showing the detail involved in collecting application information (see step 550 in FIG. 5). After commencing the process (step 550), the program is copied from the NIM server to the individual workstations (step 810). Application information is then collected from the workstation (step 820). A loop construct is entered to collect the application information for each of the applications identified. If no more applications exist for which data is to be retrieved (step 830), no branch 835 is executed and processing is terminated at terminator 890. On the other hand, if more applications exist, yes branch 840 is executed to get the application information.

First, the application logical volume name is retrieved (step 850). Next, the application mount point and filesystem name are retrieved (step 860). Finally, the application filesystem size is retrieved (step 870) before processing loops back (loop 880) to check if more applications have data to be retrieved at step 830. This loop continues until no more applications need to be retrieved, at which point no branch 835 is executed and processing is terminated at terminator 890. The information retrieved during the collection process shown in FIG. 7 is stored in a storage area of the NIM server. In an alternative embodiment, the information retrieved is stored on removable nonvolatile computer operable media, such as a diskette, tape, or CD-R.

Figure 9:
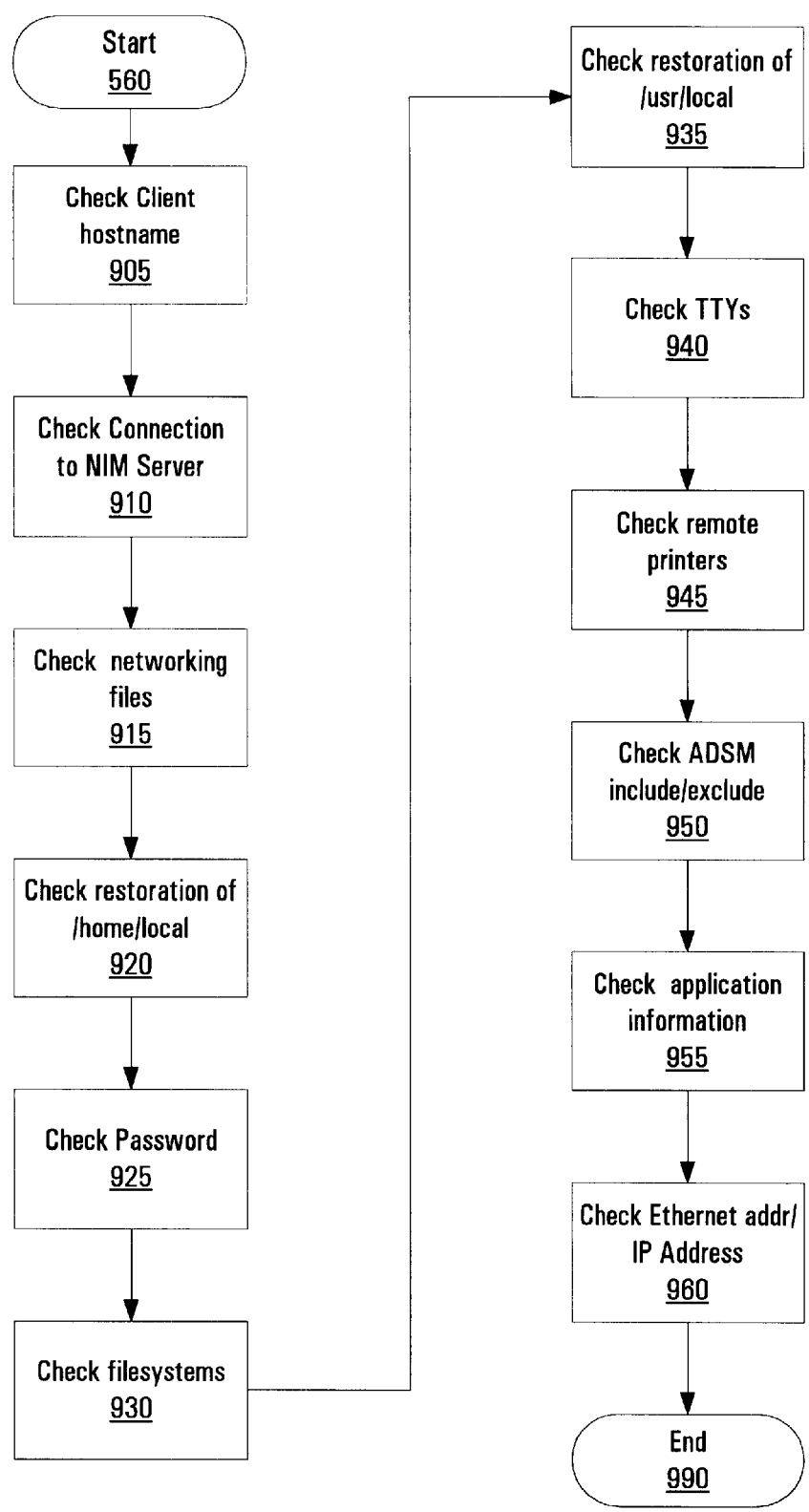
FIG. 9 is a lower-level flowchart showing the creation of a quality checklist in one embodiment of the present invention.

FIG. 9 shows a low-level flowchart detailing the creation of a quality checklist (see step 560 on FIG. 5). Processing commences (step 560) whereupon a check is made to make sure a client hostname has been retrieved (step 905). Next, a check is made to ensure that a connection has been made between the workstations and the NIM server (step 910). Networking files are then checked (step 915) to make sure they are correct. After networking files are checked, the restoration of the /home/local directory is checked (step 920). Next, passwords are checked to make sure they have been collected properly (step 925). After the passwords have been checked, the filesystems are checked (step 930). Next, the restoration of the /usr/local directory is checked (step 935). After the directory is checked, the ttys are checked and verified (step 940). Next, ADSM (IBM's ADSTAR Distributed Storage Manager) is checked for any included/excluded files (step 945). The application information that was previously identified and collected is then checked (step 950). Finally, the Ethernet and IP addresses for the workstation are checked (step 955). After all checks have been performed, the process exits at step 990. While described as a sequential process, the processing described above could take place in a different order and some processing can be done at the same time (in parallel with) other processing. The steps shown in FIG. 9 can be performed manually by an operator following an instruction sheet (an example of which is shown in Appendix D) or may be performed automatically by a program designed to perform the above-described checks.

FIG. 10 shows a low-level flowchart for duplicating the collected workstation data onto a different workstation (see step 650 in FIG. 6). First, information about the new workstation is needed. A temporary workstation name (hostname) is input by the user (input 1005) along with a temporary IP address (input 1010). Next, the permanent workstation name (hostname) (input 1015) and permanent IP address (input 1020) are input by the user. These hostnames and IP addresses are used to load the duplicate workstation identity information that was previously captured from the old workstation. After the information has been provided by the user, the workstation is connected to the NIM server in order to locate and copy the user environment data that was previously collected (step 1025). In an alternative embodiment, the user environment data is stored to a removable nonvolatile computer medium, such as a diskette, and such medium is provided to and read by the workstation in order to copy the previously captured user environment data. After the workstation has been connected to the location (NIM server or removable medium) containing the user environment data, the networking files are restored (step 1030). Next, the unique system information that was previously captured is duplicated to the new workstation (step 1035). After the unique system information is duplicated, ADSM files are restored (step 1045). Next, the application data that was previously identified and captured is duplicated to the new workstation (step 1050). After application data is restored, the tty information that was captured from the old workstation is duplicated to the new workstation (step 1055). Then the remote printer definitions that were captured from the old workstation are duplicated to the new workstation (step 1060). After the printer definitions are duplicated, the workstation's IP address and workstation name (hostname) are changed (step 1065) from the temporary hostname and IP address provided by the user in steps 1005 and 1010 to the permanent hostname and IP address provided by the user in steps 1015 and 1020. After the hostname and IP address changes have taken place, the Ethernet interfaces are checked and verified (step 1070). Next, the file permissions of key files that have been duplicated onto the new workstation are modified to reflect the move from the old workstation to the new workstation (step 1075). After the monitor timeout has been disabled (step 1080), the license file data is modified (step 1085) to reflect the duplication of licensed data, such as software products, from the old workstation to the new workstation. Finally, temporary files are cleaned up (step 1090) before the processing terminates (step 1095). The above-outlined steps are for a UNIX environment. Alternative embodiments may have somewhat different processing steps due to differences in operating systems. In addition, the steps outlined above could be performed in a somewhat different order, however the order outlined above is preferred for a UNIX environment. FIG. 11 shows a low-level flowchart of details of modifying X-windows settings on the new workstation (see step 650 in FIG. 6). First, a new window is created (step 1110). Then the X-windows session is terminated (step 1120), followed by setting the landscape (step 1130) and portrait (step 1140) settings of the new workstation's X-windows. After the settings have been changed, processing of the X-windows settings is terminated (step 1190).

Figure 12:
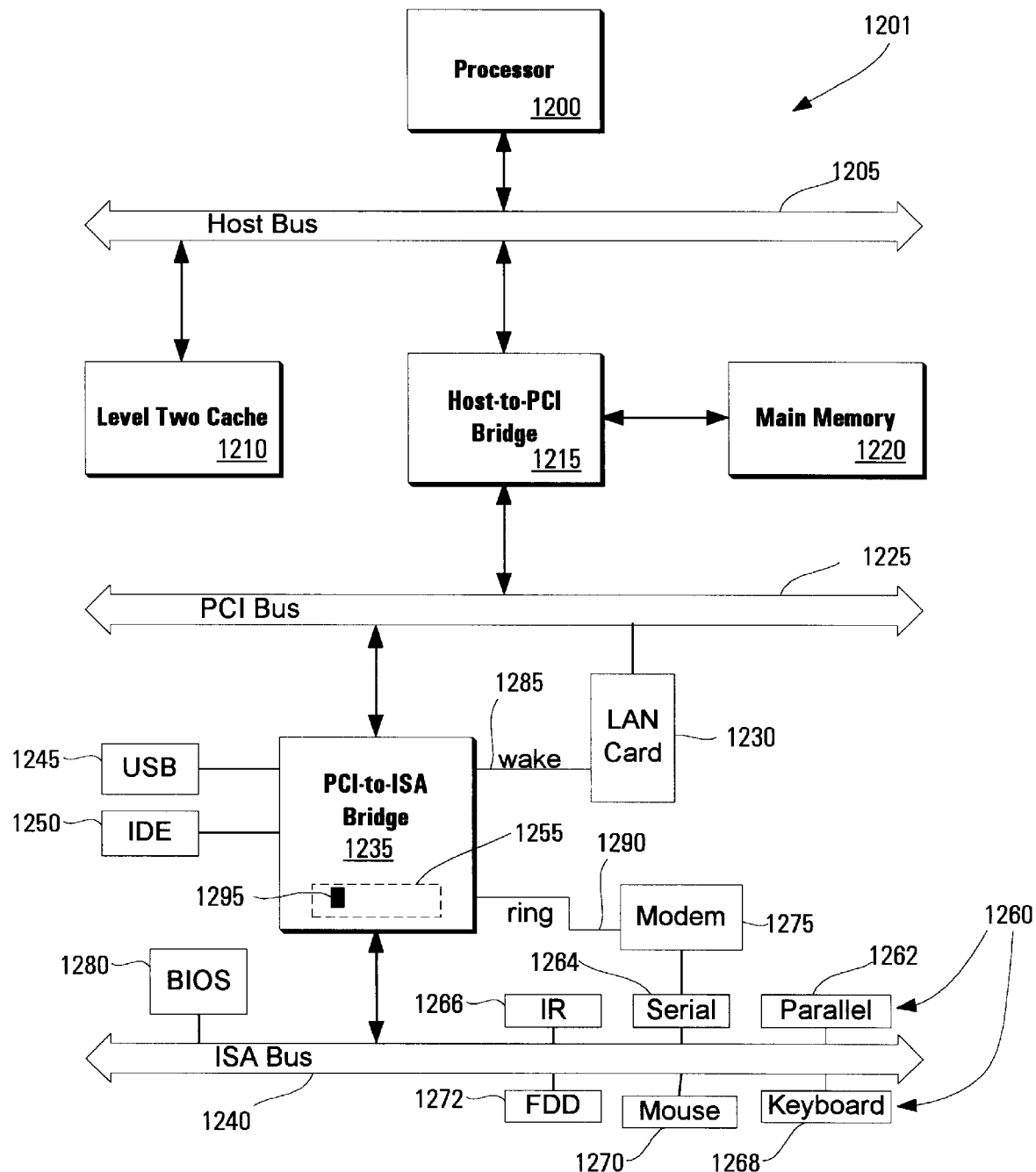
FIG. 12 is a block diagram showing an information handling system in which the present invention may be implemented.

FIG. 12 illustrates a computer system 1201 which is a simplified example of a computer system capable performing the capturing and duplicating processing described herein. Computer system 1201 includes processor 1200 which is coupled to host bus 1205. A level two (L2) cache memory 1210 is also coupled to the host bus 1205. Host-to-PCI bridge 1215 is coupled to main memory 1220, includes cache memory and main memory control functions, and provides bus control to handle transfers among PCI bus 1225, processor 1200, L2 cache 1210, main memory 1220, and host bus 1205. PCI bus 1225 provides an interface for a variety of devices including, for example, LAN card 1230. PCI-to-ISA bridge 1235 provides bus control to handle transfers between PCI bus 1225 and ISA bus 1240, universal serial bus (USB) functionality 1245, IDE device functionality 1250, power management functionality 1255, and can include other functional elements not shown, such as a real-time clock (RTC), DMA control, interrupt support, and system management bus support. Peripheral devices and input/output (I/O) devices can be attached to various interfaces 1260 (e.g., parallel interface 1262, serial interface 1264, infrared (IR) interface 1266, keyboard interface 1268, mouse interface 1270, and fixed disk (FDD) 1272) coupled to ISA bus 1240. Alternatively, many I/O devices can be accommodated by a super I/O controller (not shown) attached to ISA bus 1240.

The BIOS 1280 is coupled to ISA bus 1240, and incorporates the necessary processor executable code for a variety of low-level system functions and system boot functions. BIOS 1280 can be stored in any computer readable medium, including magnetic storage media, optical storage media, flash memory, random access memory, read only memory, and communications media conveying signals encoding the instructions (e.g., signals from a network). In order to attach computer system 1201 to a NIM server over a local area network, LAN card 1230 is coupled to PCI-to-ISA bridge 1235. Similarly, to connect to a NIM server using a telephone line connection, modem 1275 is connected to serial port 1264 and PCI-to-ISA Bridge 1235

While the computer system described in FIG. 12 is capable of executing the capturing and duplicating processes described herein, this computer system is simply one example of a computer system. Those skilled in the art will appreciate that many other computer system designs are capable of running the UNIX operating system (or any operating system, such as Windows 95/98/NT licensed by Microsoft Corporation or AIX or OS/2 licensed by IBM) and performing the processing described herein.

Figure 13:
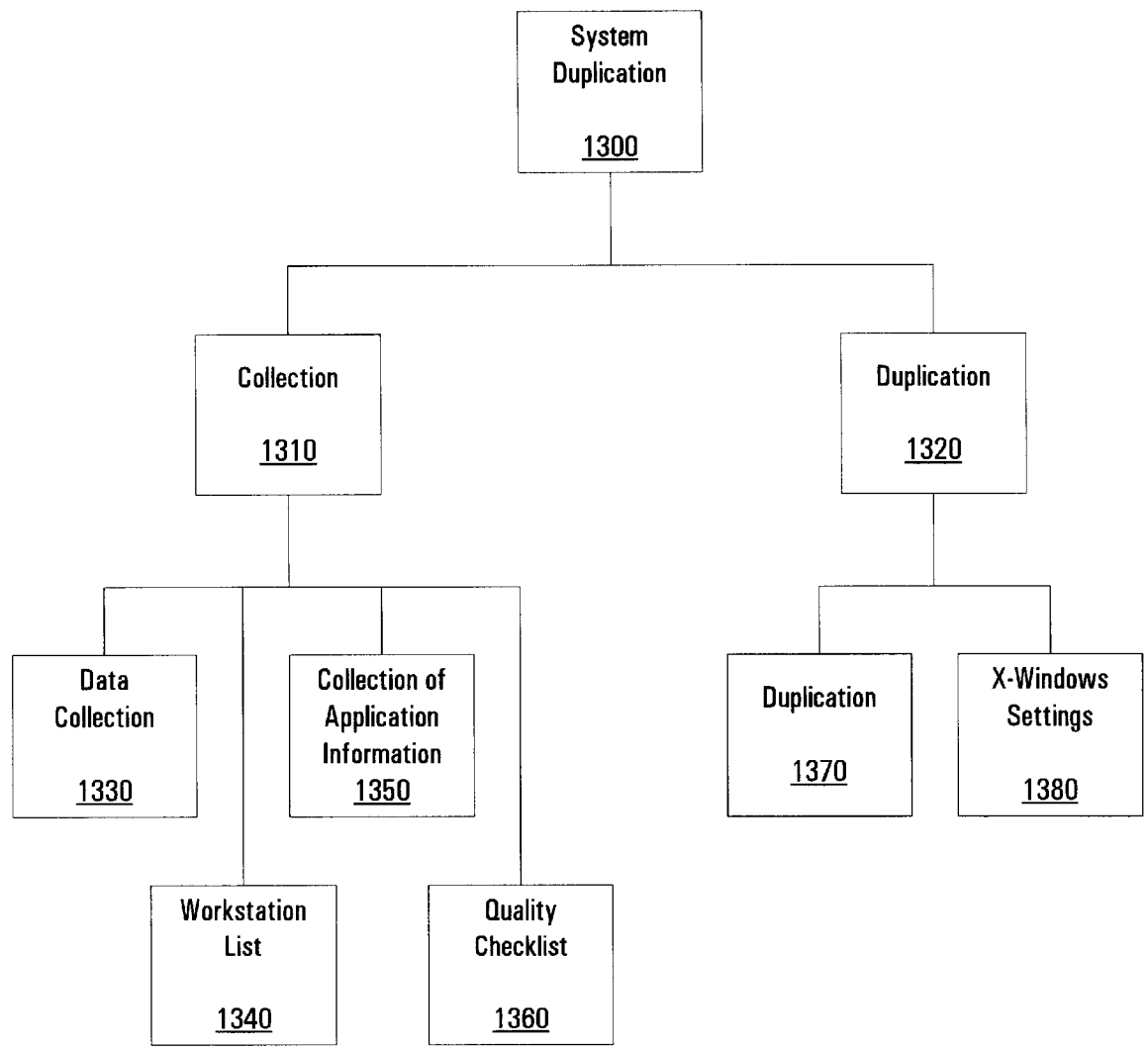
FIG. 13 is a hierarchy chart showing the script files used in one embodiment of the present invention.

FIG. 13 shows a hierarchy chart for processes involved in collecting and duplicating a workstation environment. System duplication 1300 is the highest level in the hierarchy chart. System duplication 1300 breaks down into two general processing categories: collection 1310, which collects the user environment data from the old workstation, and duplication 1320 which duplicates the information collected by collection 1310 onto a new workstation. Collection 1310 breaks down into four processes, the code for each has been provided in the attached appendix. Data collection 1330 collects the user environment data from the old workstation (for a flowchart depiction, see FIG. 7; for example script code, see Appendix A). Workstation list 1340 includes a list of workstations that will have user environment data collected and duplicated (for an example workstation list, see Appendix B). Collection of application data 1350 includes processing to collect application data from the workstation (for a flowchart depiction, see FIG. 8; for example script code, see Appendix C). Finally, quality checklist 1360 includes processing to check whether the user environment data has been successfully collected (for a flowchart depiction, see FIG. 9; for example script code used to print out a checklist to be checked manually, see Appendix D).

On the duplication 1320 side of the hierarchy chart, two processes are shown breaking down from duplication 1320. First, duplication 1370 duplicates the user environment data collected from the old workstation onto the new workstation (for a flowchart depiction, see FIG. 10; for example script code, see Appendix E). Second, X-Windows Settings 1380 sets the X-Windows settings in the new workstation (for a flowchart depiction, see FIG. 11; for example script code, see Appendix F).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Appendix

This appendix, which is part of the present disclosure, is a listing of software executed in a UNIX environment under the Korn shell (ksh) in accordance with one embodiment of the present invention. Appendix A is a shell script showing the data collection process. Appendix B is a workstation list of workstations to be duplicated. Appendix C is a shell script showing the collection of application information. Appendix D is a shell script for creating a quality checklist. Appendix E is a shell script for duplicating the collected data onto a new workstation. Appendix F is a shell script for setting the X-Windows settings on the new workstation.

A portion of the disclosure of this patent document contains material which is subject to copyright protection. The copyright owner has no objection to the facsimile reproduction by anyone of the patent documents or patent disclosure, as it appears in the Patent and Trademark Office patent files or records, but otherwise reserves all copyright rights whatsoever.

```
                                        37
Docket No. AUS0000/1US1 rsh $i "cp -p /etc/.kshrc /ibm2/$i/etc.kshrc"
      rcp -p $i:/ibm2/$i/etc.kshrc /ibm2/$i/etc.kshrc

#.................................................
 5    rsh $i "cp -p /etc/uucp/Devices /ibm2/$i/uucp.Devices"
      rcp -p $i:/ibm2/$i/uucp.Devices /ibm2/$i/uucp.Devices

#.................................................
      rsh $i "cp -p /etc/uucp/Dialcodes /ibm2/$i/uucp.Dialcodes"
10    rcp -p $i:/ibm2/$i/uucp.Dialcodes /ibm2/$i/uucp.Dialcodes

#.................................................
      rsh $i "cp -p /etc/uucp/Dialers /ibm2/$i/uucp.Dialers"
      rcp -p $i:/ibm2/$i/uucp.Dialers /ibm2/$i/uucp.Dialers
15
      #.................................................
      rsh $i "cp -p /etc/uucp/Maxuuscheds /ibm2/$i/uucp.Maxuuscheds"
      rcp -p $i:/ibm2/$i/uucp.Maxuuscheds /ibm2/$i/uucp.Maxuuscheds 20    #.................................................
      rsh $i "cp -p /etc/uucp/Maxuuxqts /ibm2/$i/uucp.Maxuuxqts"
      rcp -p $i:/ibm2/$i/uucp.Maxuuxqts /ibm2/$i/uucp.Maxuuxqts

#.................................................
25    rsh $i "cp -p /etc/uucp/Permissions /ibm2/$i/uucp.Permissions"
      rcp -p $i:/ibm2/$i/uucp.Permissions /ibm2/$i/uucp.Permissions

#.................................................
      rsh $i "cp -p /etc/uucp/Poll /ibm2/$i/uucp.Poll"
30    rcp -p $i:/ibm2/$i/uucp.Poll /ibm2/$i/uucp.Poll

#.................................................
      rsh $i "cp -p /etc/uucp/Systems /ibm2/$i/uucp.Systems"
      rcp $i:/ibm2/$i/uucp.Systems /ibm2/$i/uucp.Systems
35
      #.................................................
      rsh $i "cp -p /etc/passwd /ibm2/$i/etc.passwd"
      rcp -p $i:/ibm2/$i/etc.passwd /ibm2/$i/etc.passwd 40    #.................................................
      rsh $i "cp -p /etc/group /ibm2/$i/etc.group"
      rcp -p $i:/ibm2/$i/etc.group

#.................................................
45    rsh $i "cp -p /etc/security/passwd /ibm2/$i/etc.security.passwd"
      rcp -p $i:/ibm2/$i/etc.security.passwd /ibm2/$i/etc.security.passwd

#.................................................
      rsh $i "cp -p /etc/security/group /ibm2/$i/etc.security.group"
50    rcp -p $i:/ibm2/$i/etc.security.group /ibm2/$i/etc.security.group

#.................................................
      rsh $i "cp -p /etc/profile /ibm2/$i/etc.profile"
      rcp -p $i:/ibm2/$i/etc.profile /ibm2/$i/etc.profile
55
      #.................................................
      rsh $i "cp -p /etc/environment /ibm2/$i/etc.environment"
      rcp -p $i:/ibm2/$i/etc.environment /ibm2/$i/etc.environment 60    #.................................................
      rsh $i "cp -p /usr/lpp/X11/defaults/xinitrc /ibm2/$i/X11.xinitrc"

Atty Docket No. IBM-0001
```

What is claimed is:

1. A method for duplicating a user environment in a first computer system, said method comprising:
   collecting user environment data from the first computer system, the collecting performed by a computer program;
   storing the user environment data;
   reading the user environment data stored by the first computer system, the reading performed by a second computer system; and
   modifying user settings in the second computer system, the modifying performed by a second computer program using the user environment data.

2. The method of claim 1, wherein the collecting includes:
   designating at least one user account; and
   identifying attributes to include in the user environment data.

3. The method of claim 1, wherein the second computer program includes at least one script file.

4. The method of claim 1, further comprising:
   receiving the user environment data at the second computer system, the receiving responsive a transmission of the user environment data by the first computer system.

5. The method of claim 1, wherein the first computer system includes a UNIX operating system.

6. The method of claim 1, wherein the first computer system includes a multi-user operating system.

7. The method of claim 1, wherein the first computer system includes a multi-tasking operating system.

8. The method of claim 1, wherein the collecting is performed for a plurality of users, each of the plurality of users having one or more accounts on the first computer system.

9. The method of claim 1, wherein the user environment data includes one of printer definitions, tty definitions, network interfaces, user passwords, and license information.

10. The method of claim 1, wherein the computer program includes at least one script file.

11. The method of claim 1, wherein the storing further comprises:
    saving the user environment data onto computer operable medium.

12. The method of claim 1, wherein the storing further comprises:
    transmitting the user environment data from the first computer system to a second computer system.

13. A method for duplicating a user environment in a current computer system, said method comprising:
    reading user environment data, the reading performed by the current computer system,
        wherein the user environment data includes information gathered from a prior computer system; and
    modifying user settings in the current computer system, the modifying performed by a computer program in response to the user environment data.

14. The method of claim 13, wherein the user environment data is read from a computer operable medium accessible to the current computer system.

15. The method of claim 13, further comprising:
    receiving the user environment data at the current computer system, the receiving responsive a transmission of the user environment data by the prior computer system.

16. The method of claim 13, wherein the current computer system includes a UNIX operating system.

17. The method of claim 13, wherein the current computer system includes a multi-user operating system.

18. The method of claim 13, wherein the current computer system includes a multi-tasking operating system.

19. The method of claim 13, wherein the receiving and the modifying is performed for a plurality of users, each of the plurality of users having one or more accounts on the prior computer system.

20. The method of claim 13, wherein the user environment data includes one of printer definitions, tty definitions, network interfaces, user passwords, and license information.

21. An information handling system for duplicating user environment data in a first computer system, said system comprising:
    one or more processors;
    an operating system for controlling the collecting and storing of the user environment data by the one or more processors;
    a storage area, for storing the user environment data;
    a first network interface for connecting the first computer system to a computer network;
    a second computer system, for processing the user environment data;
    a second network interface, for connecting the second computer system to the computer network;
    means for collecting the user environment data from the first computer system;
    means for storing the user environment data;
    means for connecting the first computer system to the computer network;
    means for transmitting the user environment data from the first computer system to a second computer system through the computer network;
    means for connecting the second computer system to the computer network;
    means for receiving the user environment data from the first computer system through the network interface; and
    means for modifying user settings in the second computer system using the user environment data received from the first computer system.

22. The information handling system for duplicating user environment data as recited in claim 21, wherein the collecting includes:
    means for designating at least one user account; and
    means for identifying attributes to include in the user environment data.

23. The information handling system for duplicating user environment data as recited in claim 21, wherein the operating system includes a UNIX operating system.

24. The information handling system for duplicating user environment data as recited in claim 21, wherein the operating system includes a multi-user operating system.

25. The information handling system for duplicating user environment data as recited in claim 21, wherein the operating system includes a multitasking operating system.

26. The information handling system for duplicating user environment data as recited in claim 21, wherein the user environment data includes one of printer definitions, tty definitions, network interfaces, user passwords, and license information.

27. The information handling system for duplicating user environment data as recited in claim 21, said system further comprising:

a second computer system, for processing the user environment data;

a receiver coupled to the second computer system for receiving the user environment data from the first computer system;

means for receiving the user environment data from the first computer system; and means for modifying user settings in the second computer system in response to the user environment data received from the first computer system.

28. The information handling system for duplicating user environment data as recited in claim 21, said system further comprising:

a first nonvolatile storage device, for writing the user environment data to a computer operable medium; and means for writing the user environment data to the computer operable medium.

29. The information handling system for duplicating user environment data as recited in claim 28, said system further comprising:

a second computer system, for processing the user environment data;

a second nonvolatile storage device, for reading the user environment data from the computer operable medium;

means for reading the user environment data from the computer operable medium; and means for modifying user settings in the second computer system in response to the user environment data read from the computer operable medium.

30. A computer operable medium for duplicating user environment data, said medium comprising:

means for designating at least one user account from a computer system;

means for identifying attributes to include in the user environment data;

means for collecting the user environment data from the computer system;

means for storing the user environment data;

means for reading the user environment data stored during the means for storing the user environment data; and means for modifying user settings using the user environment data read during the means for reading.

\* \* \* \* \*